United States Patent
Diop (10) Patent No.: US 11,601,399 B2
(45) Date of Patent: Mar. 7, 2023

(54) SYSTEM AND METHOD FOR DETECTING FORBIDDEN NETWORK ACCESSES BASED ON ZONE CONNECTIVITY MAPPING

(71) Applicant: Bank of America Corporation, Charlotte, NC (US)

(72) Inventor: Sidy Diop, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 17/152,864

(22) Filed: Jan. 20, 2021

(65) Prior Publication Data

US 2022/0231992 A1   Jul. 21, 2022

(51) Int. Cl.
  *H04L 29/06*    (2006.01)
  *H04L 9/40*     (2022.01)
  *G06F 17/16*    (2006.01)

(52) U.S. Cl.
  CPC .......... *H04L 63/0263* (2013.01); *G06F 17/16* (2013.01); *H04L 63/0209* (2013.01)

(58) Field of Classification Search
  CPC ............. H04L 63/0209; H04L 63/0263; H04L 63/1433
  See application file for complete search history.

(56) References Cited

U.S. PATENT DOCUMENTS

| | | | |
|---|---|---|---|
| 5,193,087 A * | 3/1993 | Lichtash | H04Q 11/04 370/360 |
| 7,356,679 B1 | 4/2008 | Le et al. | |
| 7,702,624 B2 | 4/2010 | King et al. | |
| 7,801,896 B2 | 9/2010 | Szabo | |
| 8,433,783 B2 | 4/2013 | Jackowski et al. | |
| 8,566,920 B2 | 10/2013 | Ylönen et al. | |
| 8,695,091 B2 | 4/2014 | Komili et al. | |
| 8,813,209 B2 | 8/2014 | Bhattacharya et al. | |
| 8,844,040 B2 | 9/2014 | Harris et al. | |
| 8,924,469 B2 | 12/2014 | Raleigh et al. | |
| 9,071,542 B2 | 6/2015 | Jackowski et al. | |
| 9,094,839 B2 | 7/2015 | Shaikh et al. | |
| 9,130,864 B2 | 9/2015 | Keith | |
| 9,166,950 B2 | 10/2015 | Collins et al. | |
| 9,171,149 B2 | 10/2015 | Erlingsson | |
| 9,173,104 B2 | 10/2015 | Raleigh | |
| 9,294,378 B2 | 3/2016 | Jackowski et al. | |
| 9,407,509 B2 | 8/2016 | Porras et al. | |
| 9,438,506 B2 | 9/2016 | Ryland | |
| 9,467,454 B2 | 10/2016 | Aravindakshan et al. | |
| 9,560,081 B1 | 1/2017 | Woolward | |
| 9,602,577 B2 | 3/2017 | Jackowski et al. | |
| 9,621,595 B2 | 4/2017 | Lian et al. | |

(Continued)

*Primary Examiner* — Dao Q Ho (57) ABSTRACT

A system for automating identifications of forbidden network connections is configured to create a network connectivity matrix comprising allowability indications indicating whether establishing network connections between network zones are allowed or forbidden. The system determines whether there is any network connection between devices connected to a firewall device that violates a corresponding allowability indication in the network connectivity matrix. In response to determining at least one network connection between different devices that violates the corresponding allowability indication, the system determines that the at least one network connection is a forbidden network connection.

17 Claims, 3 Drawing Sheets

(56) References Cited

U.S. PATENT DOCUMENTS

| | | |
|---|---|---|
| 9,634,990 B2 | 4/2017 | Lee |
| 9,641,544 B1 | 5/2017 | Treat et al. |
| 9,646,309 B2 | 5/2017 | Goldschlag et al. |
| 9,699,034 B2 | 7/2017 | Lee |
| 9,712,624 B2 | 7/2017 | Lee |
| 9,729,197 B2 | 8/2017 | Gross et al. |
| 9,762,599 B2 | 9/2017 | Wager et al. |
| 9,774,604 B2 | 9/2017 | Zou et al. |
| 9,781,114 B2 | 10/2017 | Pollutro et al. |
| 9,787,546 B2 | 10/2017 | Bardgett et al. |
| 9,798,747 B2 | 10/2017 | Zhou et al. |
| 9,979,595 B2 | 5/2018 | Choudhury et al. |
| 10,003,458 B2 | 6/2018 | Ylonen |
| 10,152,515 B2 | 12/2018 | Kemp et al. |
| 10,257,186 B2 | 4/2019 | Enrique Salpico |
| 10,348,767 B1 | 7/2019 | Lee et al. |
| 10,362,074 B2 | 7/2019 | Patel et al. |
| 10,440,053 B2 | 10/2019 | Wyatt et al. |
| 10,541,969 B2 | 1/2020 | Touboul |
| 10,721,275 B2 | 7/2020 | Kung et al. |
| 10,791,052 B2 | 9/2020 | Ignatchenko |
| 10,803,005 B2 | 10/2020 | Baldry et al. |
| 10,812,530 B2 | 10/2020 | Ylonen |
| 2010/0306162 A1* | 12/2010 | Madani ............... H04W 64/00 370/254 |
| 2011/0302647 A1* | 12/2011 | Bhattacharya ...... H04L 41/0813 709/221 |
| 2013/0046864 A1* | 2/2013 | Behringer ........... H04L 61/5038 709/220 |
| 2015/0026600 A1 | 1/2015 | Dunn et al. |
| 2016/0359740 A1* | 12/2016 | Parandehgheibi .... G06F 16/122 |
| 2017/0063566 A1 | 3/2017 | Seminario et al. |
| 2017/0134422 A1 | 5/2017 | Shieh et al. |
| 2017/0230479 A1* | 8/2017 | Tolman .................. G09B 5/02 |
| 2017/0346851 A1 | 11/2017 | Drake |
| 2018/0041470 A1* | 2/2018 | Schultz ................. H04L 47/24 |
| 2018/0196827 A1 | 7/2018 | Sundaram et al. |
| 2019/0034127 A1* | 1/2019 | Chhabra ................ G06F 3/121 |
| 2019/0080088 A1 | 3/2019 | Tock et al. |
| 2020/0099658 A1* | 3/2020 | Couillard ........... H04L 63/0209 |
| 2020/0177618 A1* | 6/2020 | Hassanzadeh ........ G06F 21/552 |

* cited by examiner

FIG. 1

Firewall Configuration File 156

| Row 202 | Interface 124 | Interface IP Address 204 | Source Device 206 | Destination Device 208 | Network Connection 210 |
|---|---|---|---|---|---|
| 202a | 124a | 204a | 134a (166a) | 134b (166b) | 210a |
| 202b | 124b | 204b | 134b (166b) | 134d (166d) | 210b |
| 202c | 124c | 204c | 134c (166c) | 134a (166a) | 210c |
| 202d | 124a | 204a | 134a (166a) | 134d (166d) | 210d |
| 202e | 124d | 204d | 134d (166d) | 134c (166c) | 210e |

Components 160 / Firewall Configurations 158

*FIG. 2A*

Network Connections 210

Network Connectivity Matrix 170

| From \ To | Internal Zone 126 | Secure Zone 128 | Presentation Zone 130 | Internet 132 |
|---|---|---|---|---|
| Internal Zone 126 |  | Allow | Allow | Forbidden |
| Secure Zone 128 | Allow |  | Allow | Forbidden |
| Presentation Zone 130 | Forbidden | Allow |  | Allow |
| Internet 132 | Forbidden | Forbidden | Allow |  |

Allowable Network Connections 212 / Allowability Indications 172
Forbidden Network Connections 214

*FIG. 2B*

FIG. 3

SYSTEM AND METHOD FOR DETECTING FORBIDDEN NETWORK ACCESSES BASED ON ZONE CONNECTIVITY MAPPING

TECHNICAL FIELD

The present disclosure relates generally to information security, and more specifically to a system and method for detecting forbidden network accesses based on zone connectivity mapping.

BACKGROUND

Forbidden network connections between particular devices may occur, for example, when a system administrator intentionally or inadvertently allows network traffic between the particular devices to flow. In such situations, the particular devices may become vulnerable to information security threats and unauthorized access from outsiders. It is challenging to identify forbidden network connections between devices. Current information security and data loss prevention technologies are not configured to provide a reliable solution to identify forbidden network connections between devices.

SUMMARY

Current information security and data loss prevention technologies may not be configured to identify forbidden network connections between devices. This may lead to unauthorized access from outsiders to devices that have become exposed or accessible to outsiders. The present disclosure contemplates systems and methods for automating identifications of forbidden network connections between devices. Forbidden network connections between devices may occur, for example, when a user configures a firewall device to allow network traffic from an external device (that lives in a public or unsecured network zone, or Internet zone) to an internal device (that lives in a secured network zone, or an internal zone), even though according to security policies there should not be direct network traffic from the external device to the internal device. Within an organization, the security policies are in place to protect the internal device within the organization from outsiders or devices that belong to the public or unsecured network zone. The firewall device may be used to define network connections or network traffic routes between devices. The firewall device comprises interfaces that are used to connect to the devices and establish network connections between the devices.

In some cases, the user may intentionally or inadvertently allow network traffic from the external device to the internal device. For example, due to a shortage of Internet Protocol (IP) addresses within an organization, the user may assign an IP address that belongs to an IP address range designated for external devices to an internal device. As such, network traffic may flow from the external device to the internal device. In such cases, the internal device may become vulnerable to malicious activities, such as data exfiltration, modification, destruction, etc.

Therefore, there is a need for automatically identifying and addressing forbidden network connections or network access between devices. To this end, the present disclosure abstracts automating identifications of forbidden network connections between devices, for example, by analyzing a firewall configuration file that comprises network connections between devices, and interfaces of the firewall device.

By analyzing the firewall configuration file, the disclosed system determines a corresponding network zone to which each device belongs based on device naming conventions used for naming each device. The device naming conventions are used for naming devices that belong to different network zones. For example, a first keyword is used in naming devices that belong to a first network zone. Similarly, a second keyword is used in naming devices that belong to a second network zone. Thus, if it is determined that a name of a particular device includes the first keyword, the disclosed system determines that the particular device belongs to the first network zone.

Furthermore, the disclosed system generates an interface-to-zone map, for example, by analyzing the firewall configuration file and the device naming conventions. The interface-to-zone map indicates associations between interfaces of the firewall device and the network zones. For example, from the device naming conventions, the disclosed system determines that a particular device belongs to a particular network zone. From the firewall configuration file, the disclosed system determines that the particular device is connected to a particular interface of the firewall device. As such, the disclosed system may determine that the particular interface is associated with the particular network zone.

Furthermore, the disclosed system generates a network connectivity matrix, for example, based on processing the security policies that are in place in an organization to define allowable and forbidden network connections to protect internal devices within the organization. For example, the network connectivity matrix may comprise allowability indications indicating whether network connections between network zones are allowed.

The disclosed system determines whether there is any network connection in the firewall configuration file that violates its corresponding allowability indication in the network connectivity matrix. If the disclosed system determines a network connection that violates its corresponding allowability indication in the network connectivity matrix, the disclosed system determines that the network connection is forbidden or does not comply with the network connectivity matrix. The disclosed system may notify the user to address the forbidden network connection.

In an embodiment, a system for automating identifications of forbidden network connections comprises a processor and a memory. The memory is operable to store a firewall configuration file associated with a firewall device. The firewall configuration file comprises a set of network connections between neighboring devices and interfaces of the firewall device, where the neighboring devices belong to corresponding neighboring network zones.

Each of the neighboring devices is identified by a name set by a naming convention that is associated with a particular neighboring network zone, such that a first device, connected to a first interface of the firewall device, is identified by a first name indicating that the first device belongs to a first network zone; and a second device, connected to a second interface of the firewall device, is identified by a second name indicating that the second device belongs to a second network zone.

The processor is operably coupled with the memory. The processor is configured to create a network connectivity matrix between the neighboring network zones, where the connectivity matrix comprises a set of allowability indications indicating whether establishing network connections between different neighboring network zones is allowed. The processor determines whether there is any network connection between different neighboring devices that violates a corresponding allowability indication indicated in the connectivity matrix. In response to determining at least one network connection between different neighboring devices that violates the corresponding allowability indication, the processor determines that the at least one network connection is a forbidden network connection.

The disclosed system provides several practical applications and technical advantages which include: 1) technology that determines device naming conventions using in naming devices in different network zones from a firewall configuration file associated with a firewall device; 2) technology that generates an interface-to-zone map based on the determined device naming conventions, where the interface-to-zone map indicates associations between interfaces of the firewall device and network zones; 3) technology that generates a network connectivity matrix based on processing security policies that indicate allowable and forbidden network connections between network zones, where the network connectivity matrix comprises a set of allowability indications indicating whether network connections between particular network zones are allowed or forbidden; and 4) technology that determines whether there is any network connection in the firewall configuration file that violates its corresponding allowability indication in the network connectivity matrix.

As such, the system described in this disclosure may improve the information security and data loss prevention technologies by automating identifications of forbidden network connections between devices from different network zones. The disclosed system may be integrated into a practical application of improving the underlying operations of internal devices within an organization by identifying forbidden network connections with the internal devices and addressing those forbidden network connections, for example, by notifying a user, terminating the forbidden network connections, among others. As such, the internal devices within the organization may be kept secured from unauthorized accesses from outsiders and external devices from public or unsecured network zones.

This, in turn, provides an additional practical application of securing data stored in the memory of the internal devices within the organization. As such, the data stored in the memory of the internal devices within the organization is secured from being accessed, modified, exfiltrated, or destroyed.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
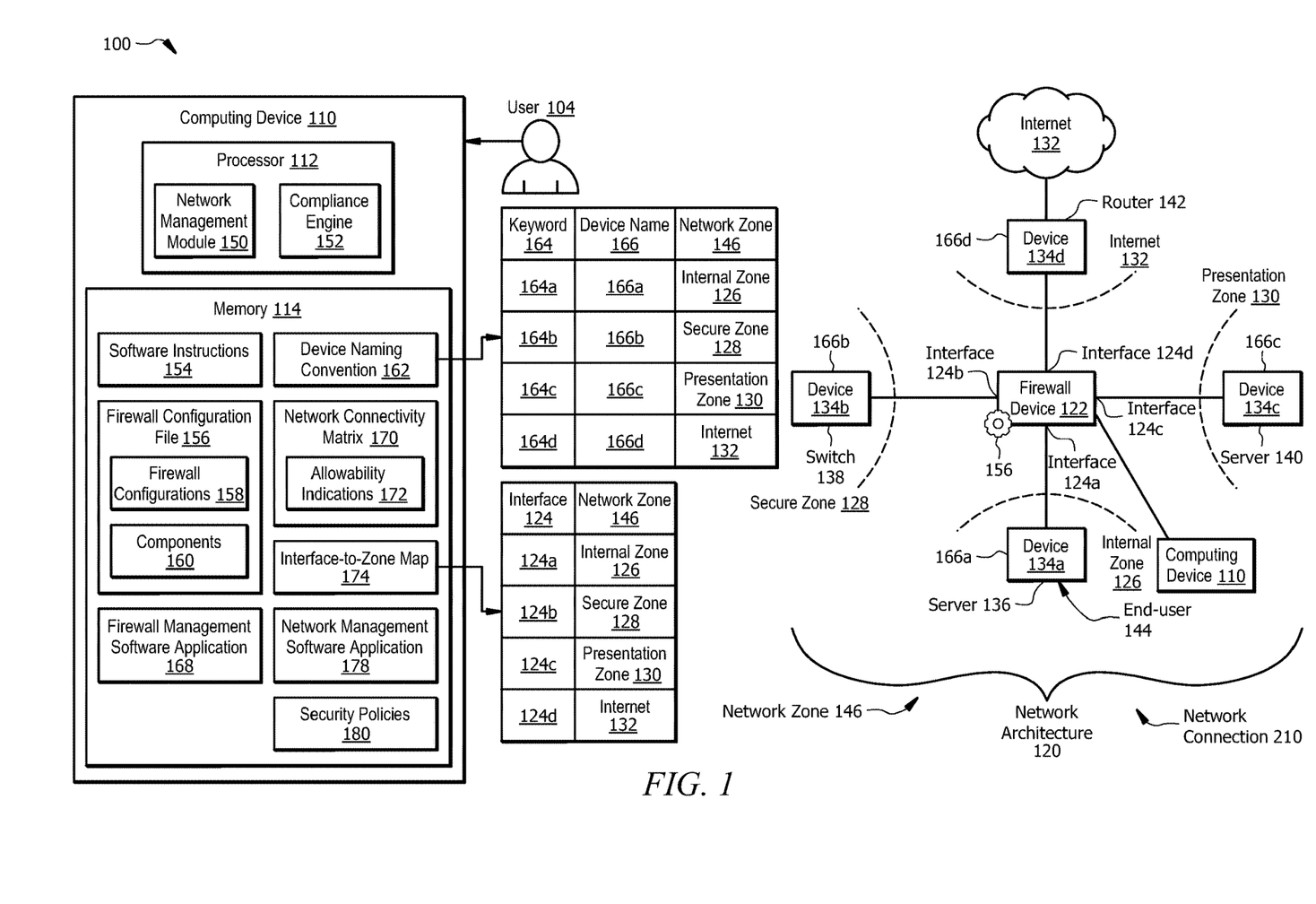
FIG. 1 illustrates an embodiment of a system configured to automate identifications of forbidden network connections between devices.

FIG. 1 illustrates one embodiment of a system 100 that is configured to automate identifications of forbidden or non-compliant network accesses 210 among devices 134 from different network zones 146. In one embodiment, system 100 comprises a computing device 110 and a firewall device 122. System 100 may further comprise a network architecture 120 that comprises a set of devices 134 in various network zones 146 operably connected through the firewall device 122. The computing device 110 comprises a processor 112 that is operably coupled with a memory 114. Memory 114 comprises software instructions 154 that when executed by the processor 112 cause the processor 112 to perform one or more functions described herein. For example, when the software instructions 154 are executed, network management module 150 and compliance engine 152 are triggered to detect forbidden network accesses 210 among devices 134 from different network zones 146. In other embodiments, system 100 may not have all of the components listed and/or may have other elements instead of, or in addition to, those listed above.

Figure 2A:
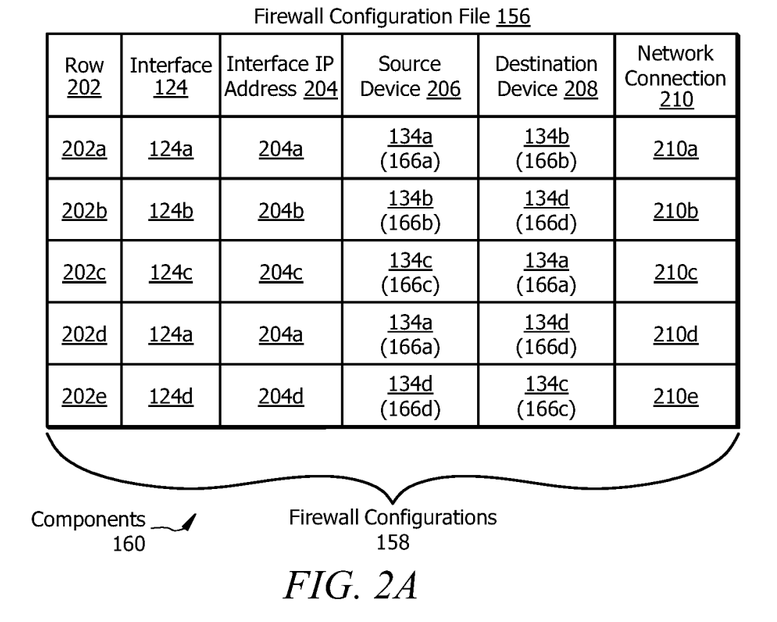
FIG. 2A illustrates an example firewall configuration file.
Figure 2B:
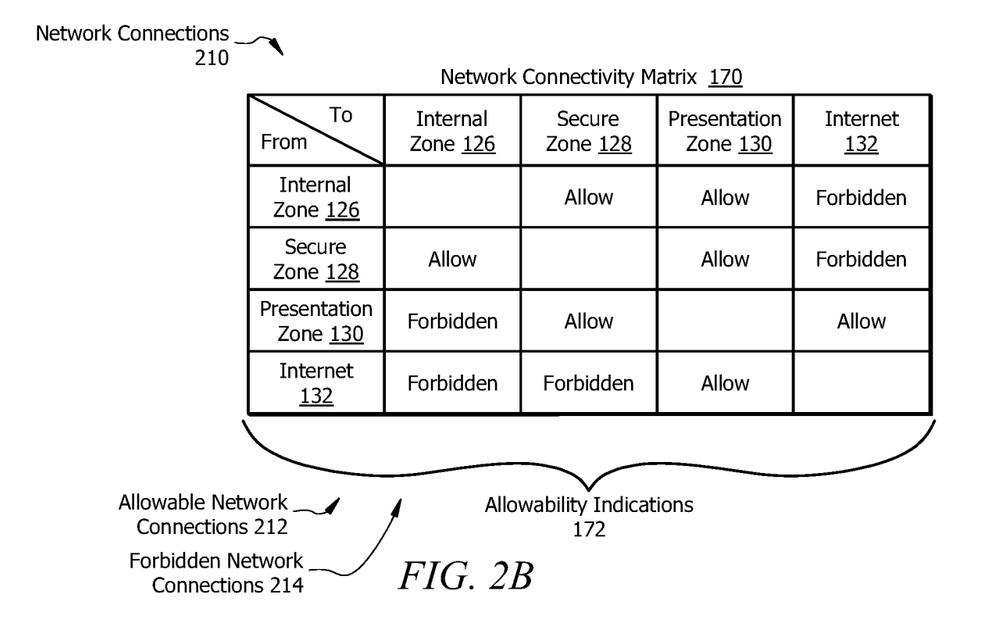
FIG. 2B illustrates an example network connectivity matrix.

In general, system 100 automates identifications of forbidden network accesses 210 among devices 134 from different network zones 146. To this end, system 100 (via the network management module 150) receives a firewall configuration file 156 that is associated with the firewall device 122. The firewall configuration file 156 comprises firewall configurations 158 that indicate network traffic paths or network connections 210 among neighboring devices 134 and interfaces 124 of the firewall device 122, where the neighboring devices 134 belong to neighboring network zones 146. As an example, the firewall configuration file 156 may indicate that a first device 134a is connected to a first interface 124, and a second device 134b is connected to a second interface 124b of the firewall device 122. An example of the firewall configuration file 156 is illustrated in FIG. 2A. The network management module 150 may process or analyze the firewall configuration file 156, and determine a respective network zone 146 that each device 134 belongs to based on device naming conventions 162 used for naming devices 134 in each network zone 146. In one embodiment, naming a particular device 134 depends on a respective network zone 146 that the particular device 134 belongs. For example, if a first device 134a is designated to belong to the internal zone 126, a first keyword 164a is used in naming the first device 134a. Thus, in this example, based on the device naming convention 162, the network management module 150 determines that the first device 134a belongs to the internal zone 126. The network management module 150 may determine mappings or associations between the interfaces 124 and the network zones 146 based on the device naming conventions 162 and the firewall configuration file 156. This results in creating an interface-to-zone map 174 that indicates mappings or associations between the interfaces 124 and network zones 146. The network management module 150 may also create a network connectivity matrix 170. The network connectivity matrix 170 comprises a set of allowability indications 172 indicating whether establishing network connections 210 between network zones 146 (or network connections 210 between devices 134 from different network zones 146) are allowed or not. As an example, the network connectivity matrix 170 may indicate that direct network connections 210 from the internal zone 126 to Internet 132 are forbidden, and direct network connections 210 from the internal zone 126 to the secure zone 128 are allowed. An example of the network connectivity matrix 170 is illustrated in FIG. 2B. The compliance engine 152 determines whether there is any network connection 210 between devices 134 (indicated in the firewall configuration file 156) that violates its corresponding allowability indication 172 (indicated in the network connectivity matrix 170) by cross-referencing the firewall configuration file 156 with the interface-to-zone map 174. In response to determining at least one network connection 210 between devices 134 that violates its corresponding allowability indication 172, the compliance engine 152 determines that the at least one network connection 210 is a forbidden or non-compliant network connection 210. In this way, the compliance engine 152 may capture or detect all instances of forbidden or non-compliant network connections 210 between devices 134 from various network zones 146. These network connection violations are documented and provided to a user 104, such as a system administrator to address them.

System Components

Computing device 110 is generally any device that is configured to process data and interact with users 104. Examples of computing device 110 include, but are not limited to, a personal computer, a desktop computer, a workstation, a server, a laptop, a tablet computer, etc. The computing device 110 may act as a presentation layer for the firewall device 122 to the user 104 to manage firewall configurations 158 associated with the firewall device 122. For example, a firewall management software application 168 that is associated with the firewall device 122 can be installed on the computing device 110, and a user 104 can configure the firewall configurations 168 for the firewall device 122 from the firewall management software application 168 on a user interface of the computing device 110. The firewall configurations 158 correspond to network traffic routes between devices 134. For example, configuring the firewall configurations 158 may comprise allowing a communication path or a network connection 210 from the first device 134a to the second device 134b. The firewall configurations 158 are stored in the firewall configuration file 156 as discussed in more detail in FIG. 2A.

The computing device 102 is operably coupled to the firewall device 122. The computing device 102 may be coupled to the firewall device 122 using any suitable medium. For example, the computing device 102 may be hardwired to the firewall device 122, for example, through an Ethernet cable. In another example, the computing device 102 may be wirelessly coupled to the firewall device 122, for example, through WiFi or other methods of wireless communications.

Processor 112 comprises one or more processors operably coupled to memory 114. The processor 112 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 112 may be a programmable logic device, a microcontroller, a microprocessor, or any suitable combination of the preceding. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 154) to implement functions of the computing device 110. In this way, processor 112 may be a special-purpose computer designed to implement the functions disclosed herein. In an embodiment, the processor 112 is implemented using logic units, FPGAs, ASICs, DSPs, or any other suitable hardware. The processor 112 is configured to operate as described in FIGS. 1-3. For example, the processor 112 may be configured to perform one or more steps of method 300 as described in FIG. 3.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store the software instructions 154, firewall configuration file 156, device naming conventions 162, firewall management software application 168, network connectivity matrix 170, interface-to-zone map 174, network management software application 178, security policies 180, and/or any other data or instructions. The software instructions 154 may comprise any suitable set of instructions, logic, rules, or code operable to execute the processor 112. For example, the software instructions 154 may include code that when executed by the processor 112, causes the processor 112 to process the firewall configuration file 156, create the network connectivity matrix 170, create the interface-to-zone map 174, identify instances of forbidden network accesses 210 between devices 134, and any other function described herein.

Network Architecture

Network architecture 120 is generally a map of network connections 210 between devices 134 (e.g., devices 134a-d). In other words, the network architecture 120 illustrates communication paths between devices 134 in network zones 146. The network architecture 120 may be referred to as a graphical representation of network connections 210 between devices 134a-d as defined or configured by the firewall device 122 in the firewall configuration file 156.

In a particular example, the network architecture 120 may be a map of network connections 210 between devices 134 within an organization to configure the network connections 210 between devices 134 such that internal devices 134 (associated with the organization) that are desired to be secured from unauthorized accesses from external devices 134 or outsiders are protected by the firewall device 122. As such, the firewall device 122 may be implemented in the network architecture 120 to filter or block unauthorized accesses or data packets coming from the external devices 134 or outsiders to the internal devices 134 within the organization.

Each of the devices 134a-d may be, for example, a computing device (e.g., computing device 110), a laptop, a desktop computer, a personal device, a mobile device, a server, or any device 134 that is capable of communicating with another device 134.

In the example of FIG. 1, the network architecture 120 illustrates network connections 210 between four devices 134a-c from four network zones 126, 128, 130, and 132 through the firewall device 122. As illustrated in FIG. 1, a first device 134a belongs to the internal zone 126, a second device 134b belongs to the secure zone 128, a third device 134c belongs to the presentation zone 130, and a fourth device 134d belongs to the Internet 132. In this disclosure, Internet 132 may interchangeably be referred to as Internet zone 132. Internal zone 126 corresponds to a private zone within the organization where end-users 144 access their devices 134, such as the first device 134a to access data and perform their daily tasks. In a particular example, the first device 134a may be a server 136. Secure zone 128 and presentation zone 130 act as middle network zones 146 between the internal zone 126 and the Internet 132 to filter or block harmful or malicious network traffic coming from the Internet 132 to devices 134a in the internal zone 126. In a particular example, the second device 134b may be a switch 138 that connects multiple devices 134b to devices 134 from other network zones 146, i.e., from internal zone 126, presentation zone 130, and the Internet 132. In a particular example, the third device 134c may be a server 140. Internet 132 corresponds to the public or unsecured network zone 146 where a cloud of devices 134d live. In other words, Internet 132 is a catch-all network zone 146 for devices 134d that are not segmented and do not belong to other network zones 146. In a particular example, the fourth device 134d may be a router 142.

These network zones 146 are defined or segmented to protect devices 134a in the internal zone 126 from being infected by harmful or malicious network traffic or data coming from other network zones 146 including the secure zone 128, presentation zone 130, and Internet 132. For example, the firewall device 122 is configured (as defined in the firewall configuration file 156) to protect devices 134a in the internal zone 126 from being infected by malicious network traffic coming from the Internet 132 where outsiders could initiate unauthorized access to the devices 134a to perform malicious activities, such as sending harmful or malicious code to exfiltrate, extract, modify, destroy data present at devices 134a. The network zones 146 are defined or segmented by the firewall device 122 implementing the firewall configuration file 156 as described below.

Firewall Device

Firewall device 122 is generally any device that is configured to manage network traffic and network accesses 210 between devices 134. The firewall device 122 comprises interfaces 124 that are used to connect to the neighboring devices 134. In one embodiment, the interfaces 124 may support wired communication, such as through Ethernet ports. In one embodiment, the interfaces 124 may support wireless communication, such as WiFi, Bluetooth, etc. In one embodiment, the interfaces 124 may comprise physical interfaces 124. In one embodiment, the interfaces 124 may comprise virtual interfaces 124. For example, a virtual interface 124 may be connected to a virtual machine, e.g., a virtual device 134.

In the example of FIG. 1, a first interface 124a is connected to the first device 134a, a second interface 124b is connected to the second device 134b, a third interface 124c is connected to the third device 134c, and a fourth interface 124d is connected to the fourth device 134d. Although in FIG. 1 the firewall device 122 is illustrated with four interfaces 124a-d, it is understood that the firewall device 122 may comprise any suitable number of interfaces 124, for example, five, ten, fifteen, etc. Furthermore, in other examples, interfaces 124 may be connected to other devices 134 in the same or different network zones 146.

In one embodiment, the firewall device 122 may be configured to manage network traffic and network connections 210 between devices 134 by implementing the firewall configuration file 156. In other words, the firewall device 122 may be used to configure network connectivity between the devices 134. For example, the user 104 can use the firewall management software application 168 to configure the firewall device 122 to allow or block network connections 210 between devices 134a-d. Furthermore, the user 104 can allow or block network traffic or network connections 210 between the interfaces 124.

In one embodiment, the firewall device 122 may be configured to define network zones 146. In other words, the firewall device 122 may be configured to perform a segmentation between devices 134a-d to define network accesses 210 between the devices 134a-d. To this end, particular keywords 164 in naming devices 134a-d belonging to different network zones 146 are used to determine a corresponding network zone 146 that each device 134 belongs to. For example, a user 104 can configure the firewall device 122 to define the network zones 146 by specifying names 166 for devices 134 based on a particular device naming convention 162. As such, the device naming convention 162 can be leveraged to classify each device 134 to a particular network zone 146.

Device naming convention 162 may comprise a list of particular keywords 164 to be used in naming devices 134 in different network zones 146. As an example, a first keyword 164a, such as SVR01, may be used in naming devices 134a in the internal zone 126. The first keyword 164a may be placed in any position in the names 166 of the devices 134a.

In this example, a device 134a may be named "XXXSVR01XXX-1.0," where X's can be any letter, symbol, number, or character. Similarly, another device 134a in the internal zone 126 may be named "XXXSVR01XXX-2.0," where X's can be any letter, symbol, number, or character. As another example, a second keyword 164b, such as SWT10, may be used in naming devices 134b in the secure zone 128. As another example, a third keyword 164c, such as SVR07, may be used in naming devices 134c in the presentation zone 130. As another example, a fourth keyword 164d, such as FWR90, may be used in naming devices 134d in the Internet zone 132.

Network Management Module

Network management module 150 may be implemented by the processor 112 executing the software instructions 154 to process firewall configuration file 156 to determine the device naming conventions 162, generate the network connectivity matrix 170, and generate the interface-to-zone map 174. In one embodiment, the network management module 150 may be associated with a network management software application 178 installed on the computing device 110 that provides a graphical user interface to the user 104 to interact with.

In one embodiment, the network management module 150 may process the firewall configuration file 156 by parsing the firewall configuration file 156, identifying parameters or components 160, and defining the components 160 as objects to determine their associations or relationships. In other words, the network management module 150 may take an object-oriented approach in processing and analyzing the firewall configuration file 156. Referring to FIG. 2A, the components 160 may comprise the interfaces 124, interface Internet Protocol (IP) addresses 204, source devices 206, destination devices 208, and network connections 210. The components 160 are described in detail further below. Referring back to FIG. 1, for example, the network management module 150 may parse the firewall configuration file 156, identify and define the components 160 as objects, and use those objects to determine the naming conventions 162, generate the network connectivity matrix 170, and generate the interface-to-zone map 174. To this end, the network management module 150 may be implemented by an Object-Oriented Programming (OOP) language.

In an alternative embodiment, the network management module 150 may characterize or define the components 160 presented in the firewall configuration file 156 by any suitable data structure, including graphs, trees, arrays, and the like to determine their relationships and associations.

In an alternative embodiment, the network management module 150 may process the firewall configuration file 156 by any suitable data format processing technique that the firewall configuration file 156 is stored as. For example, the firewall configuration file 156 may be stored as a plaintext file, an Extensible Markup Language (XML) file, a binary format file, or any other data format. In another example, the firewall configuration file 156 may be encoded by a programming language, such as assembly, Java, etc. As such, the network management module 150 may process the firewall configuration file 156 by any suitable data format processing technique that the firewall configuration file 156 is stored as. An example firewall configuration file 156 is illustrated in FIG. 2A.

Referring to FIG. 2A, an example firewall configuration file 156 is illustrated that provides information about network connections 210 between the firewall device 122 and the devices 134a-d. In one embodiment, the firewall configuration file 156 illustrated in FIG. 2A is a firewall configuration file 156 that is processed by the network management module 150. The firewall configuration file 156 comprises network connections 210 between interfaces 124 (of the firewall device 122) and devices 134, similar to as presented in the network architecture 120 of FIG. 1. In the example of FIG. 2A, the firewall configuration file 156 indicates that the first interface 124a is connected to the first device 134a, the second interface 124b is connected to the second device 134b, the third interface 124c is connected to the third device 134c, and the fourth interface 124d is connected to the fourth device 134d.

The firewall configuration file 156 may further comprise interface IP addresses 204 associated with the interfaces 124. The firewall configuration file 156 may further comprise network connections 210 from various source devices 206 to various destination devices 208. The source devices 206 and destination devices 208 may be instances of devices 134 (see FIG. 1).

In the example of FIG. 2A, the firewall configuration file 156 indicates that there is a first network connection 208a from the first device 134a to the second device 134b, a second network connection 208b from the second device 134b to the fourth device 134d, a third network connection 208c from the third device 134c to the first device 134a, a fourth network connection 208d from the first device 134a to the fourth device 134d, and a fifth network connection 108e from the fourth device 134d to the third device 134c.

After the processing operation of the firewall configuration file 156 is completed, the network management module 150 may read (or parse) the firewall configuration file 156 and determine associations between the components 160. For example, in the case of the first row 202a of the firewall configuration file 156, the network management module 150 determines that the first device 134a has the first name 166a and is connected to the first interface 124a. In another example, the network management module 150 determines that there is a first network connection 208a from the first device 134a to the second device 134b. Similarly, the network management module 150 may determine associations between the devices 134 and interfaces 124, and network connection 210 among devices 134 in other rows 202 of the firewall configuration file 156.

Extracting Device Naming Conventions

Referring back to FIG. 1, as described above, the network management module 150 may determine or extract the device naming conventions 162 from the firewall configuration file 156. In one embodiment, the network management module 150 may use a text processing technique to parse the firewall configuration file 156 to identify or extract the device naming conventions 162 used for naming each device 134 in each network zone 146. For example, the network management module 150 may be provided with a list of keywords 164 to search for in the firewall configuration file 156, where each keyword 164 in the list of keywords 164 is used for naming devices 134 in a particular network zone 146. As such, the network management module 150 may determine that, for example, devices 134 whose names 166 include the first keyword 164a belong to the internal zone 126, devices 134 whose names 166 include the second keyword 164b belong to the secure zone 128, devices 134 whose names 166 include the third keyword 164c belong to the presentation zone 130, and devices 134 whose names 166 include the fourth keyword 164d belong to the Internet 132. In this way, the network management module 150 may create the device naming convention table 162 that indicates associations between the network zones 146 and devices 134 having particular keywords 164 in their corresponding names 166.

Generating the Interface-To-Zone Map

The network management module 150 may generate the interface-to-zone map 174 by analyzing the firewall configuration file 156 based on the extracted device naming convention 162. The network management module 150 may generate the interface-to-zone map 174 by determining associations between the network zones 146 and interfaces 124 from the firewall configuration file 156. In one embodiment, the network management module 150 may determine the associations between the network zones 146 and interfaces 124 from the firewall configuration file 156 by text processing, XML, processing, or any other data format processing technique that the firewall configuration file 156 is stored as, similar to that described above. As described above, the network management module 150 determines a corresponding network zone 146 that each device 134 is connected to by determining the device naming convention table 162. Using the device naming convention table 162, the network management module 150 determines a corresponding network zone 146 that each device 134 belongs to from the firewall configuration file 156.

Referring to FIG. 2A, for example, in a case of the first row 202a, the network management module 150 determines that the first device 134a is connected to the first interface 124a. The network management module 150, based on the device naming convention table 162, determines that the first device 134a belongs to the internal zone 126. As such, the network management module 150 determines that the first interface 124a is associated with the internal zone 126.

With a similar method, the network management module 150 may determine a corresponding network zone 146 that each of interfaces 124b-d is associated with. For example, the network management module 150 may determine that the second interface 124b is associated with the secure zone 128, the third interface 124c is associated with the presentation zone 130, and the fourth interface 124d is associated with the Internet 132. Accordingly, the network management module 150 may generate the interface-to-zone map 174 illustrated in FIG. 1.

Generating the Network Connectivity Matrix

Referring back to FIG. 1, the network management module 150 may generate the network connectivity matrix 170. In one embodiment, the network management module 150 may generate the network connectivity matrix 170 based on processing a set of security policies 180.

A set of security policies 180 may indicate which network connections 210 should be allowed and which should be forbidden in the network architecture 120. The purpose of the security policies 180 is to protect devices 134a in the internal zone 126 by filtering and blocking outsiders and other devices 134 from gaining unauthorized access to the devices 134a. The set of security policies 180 may be set by the user 104. In one example, the set of security policies 180 may be stored in a library file to be imported into the network management module 150. In some examples, the set of security policies 180 may be stored in any suitable data format, including plaintext, XML, binary, among other data formats. In some examples, the set of security policies 180 may be encoded in a programming language, such as assembly, Java, etc.

In some embodiments, the network management module 150 may generate the network connectivity matrix 170 by analyzing the set of security policies 180. For example, the network management module 150 may analyze the set of security policies 180 by implementing text processing, parsing techniques, or other data format processing that the set of security policies 180 may be stored as. In analyzing the set of security policies 180, the network management module 150 may determine allowability indications 172 indicating allowable and forbidden network accesses 210 between devices 134. The network management module 150 may then compile the determined allowability indications 172 in a matrix format to generate the network connectivity matrix 170, similar to that illustrated in FIG. 2B. For example, a first security policy 180 may indicate that there should not be direct network access from the Internet 132 to the internal zone 126. For this example, the network management module 150 fills out a corresponding element in the network connectivity matrix 170 by an allowability indication 172 reflecting the first security policy 180 as illustrated in FIG. 2B, i.e., that network connections 210 from the Internet 132 to the internal zone 126 are forbidden. Similarly, the network management module 150 may fill out other elements of the network connectivity matrix 170 with corresponding allowability indications 172.

Referring to FIG. 2B, an example network connectivity matrix 170 is illustrated with a set of allowability indications 172 indicating whether establishing network connections 210 between different neighboring network zones 146 are allowed. For example, the set of allowability indications 172 may identify allowable network connections 212, and forbidden network connections 214, where the allowable network connections 212 and forbidden network connections 214 may be instances of the network connections 210 of FIG. 2A. In the example of FIG. 2B, the network connectivity matrix 170 illustrates allowability indications 172 for establishing network connections 210 among the internal zone 126, secure zone 128, presentation zone 130, and Internet 132.

As can be seen in FIG. 2B, the network connectivity matrix 170 indicates that network connections 210 from the internal zone 126 to the secure zone 128 and presentation zone 130 are allowed as indicated by an "allowed" allowability indication 172, and network connections 210 from the internal zone 126 to Internet 132 are forbidden as indicated by a "forbidden" allowability indication 172. Likewise, the network connectivity matrix 170 indicates allowability indications 172 for establishing network connections 210 among other network zones 146.

Compliance Engine

Referring back to FIG. 1, compliance engine 152 may be implemented by the processor 112 executing the software instructions 154 to detect non-compliant or forbidden network connections 210 between devices 134a-d. To this end, the compliance engine 152 is provided with the firewall configuration file 156, the interface-to-zone map 174, and network connectivity matrix 170 as inputs. In one embodiment, the compliance engine 152 may cross-reference the firewall configuration file 156 with the interface-to-zone map 174 to determine whether there is any network connection 210 between devices 134 (as indicated in the firewall configuration file 156) that violates a corresponding allowability indication 172 (as indicated in the network connectivity matrix 170). The corresponding description below describes example use-cases where the compliance engine 152 determines whether a network connection 210 between devices 134 complies with the network connectivity matrix 170 based on the interface-to-zone map 174.

Referring to FIGS. 2A and 2B, in the example of the first row 202a of the firewall configuration file 156 in FIG. 2A, the compliance engine 152 determines that the first network connection 210a is from the first device 134a (that is connected to the first interface 124a) to the second device 134b (that is connected to the second interface 124b). The compliance engine 152 parses or searches through the interface-to-zone map 174 to determine corresponding network zones 146 that the first interface 124a and the second interface 124b are associated with. The compliance engine 152 determines that the first interface 124a is associated with the internal zone 126, and the second interface 124b is associated with the secure zone 128. Thus, the compliance engine 152 determines that the first network connection 210a is from the internal zone 126 to the secure zone 128. The compliance engine 152 searches through the network connectivity matrix 170 and determines that network connections 210 from the internal zone 126 to the secure zone 128 are allowed, as indicated by a corresponding allowability indication 172. Thus, the compliance engine 152 determines that the first network connection 210a complies with its corresponding allowability indication 172 in the network connectivity matrix 170, i.e., the first network connection 210a is allowed or compliant with the network connectivity matrix 170.

In the example of the second row 202b of the firewall configuration file 156, the compliance engine 152 determines that the second network connection 210b is from the second device 134b (that is connected to the second interface 124b) to the fourth device 134d (that is connected to the fourth interface 124d). The compliance engine 152 searches through the interface-to-zone map 174 and determines that the second network connection 210b is from the secure zone 128 to the Internet 132. The compliance engine 152 searches through the network connectivity matrix 170 and determines that network connections 210 from the secure zone 128 to the Internet 132 are forbidden, as indicated by a corresponding allowability indication 172. Thus, the compliance engine 152 determines that the second network connection 210b does not comply with its corresponding allowability indication 172 in the network connectivity matrix 170, i.e., the second network connection 210b is forbidden or non-compliant with the network connectivity matrix 170.

In the example of the third row 202c of the firewall configuration file 156, the compliance engine 152 determines that the third network connection 210c is from the presentation zone 130 to the internal zone 126 based on searching through the network-to-zone map 174, similar to the examples described above in the first and second rows 202a and 202b. The compliance engine 152, by searching through the network connectivity matrix 170, determines that network connections 210 from the presentation zone 130 to the internal zone 126 are forbidden. Thus, the compliance engine 152 determines that the third network connection 210c does not comply with its corresponding allowability indication 172 in the network connectivity matrix 170, i.e., the third network connection 210c is forbidden or non-compliant with the network connectivity matrix 170.

In the example of the fourth row 202d of the firewall configuration file 156, the compliance engine 152 determines that the fourth network connection 210d is from the internal zone 126 to the Internet 132 based on searching through the network-to-zone map 174, similar to the examples described above in the first and second rows 202a and 202b. The compliance engine 152, by searching through the network connectivity matrix 170, determines that network connections 210 from the internal zone 126 to the Internet 132 are forbidden. Thus, the compliance engine 152 determines that the fourth network connection 210d does not comply with its corresponding allowability indication 172 in the network connectivity matrix 170, i.e., the fourth network connection 210d is forbidden or non-compliant with the network connectivity matrix 170.

In the example of the fifth row 202e of the firewall configuration file 156, the compliance engine 152 determines that the fifth network connection 202e is from the Internet 132 to the presentation zone 130 based on searching through the network-to-zone map 174, similar to the examples described above in the first and second rows 202a and 202b. The compliance engine 152, by searching through the network connectivity matrix 170, determines that network connections 210 from the Internet 132 to the presentation zone 130 are allowed. Thus, the compliance engine 152 determines that the fifth network connection 210e complies with its corresponding allowability indication 172 in the network connectivity matrix 170, i.e., the fifth network connection 210e is allowed or compliant with the network connectivity matrix 170.

In one embodiment, the compliance engine 152 may be associated with the network management module 150. In an alternative embodiment, the compliance engine 152 may be a stand-alone module.

Examples of Firewall Configuration File and Network Connectivity Matrix

FIG. 2A illustrates an example of the firewall configuration file 156. Aspects of the firewall configuration file 156 are described above, and additional aspects are provided below. In one embodiment, the firewall configuration file 156 may not have all the components 160 and/or may have other components 160 instead of, or in addition to, those listed in the firewall configuration file 156.

In one embodiment, the firewall configuration file 156 may not be available in memory 114 of FIG. 1. For example, different components 160 or firewall configurations 158 may be stored in different tables in the memory 114 of FIG. 1. As such, the network management module 150 may execute the software instructions 154 to compile all the components 160 to construct the firewall configuration file 156 similar to that illustrated in FIG. 2A.

In one embodiment, there may be multiple firewall configuration files 156 associated with the firewall device 122 (see FIG. 1). In one embodiment, there may be multiple firewall configuration files 156 associated with multiple firewall devices 122 (see FIG. 1). As such, the network management module 150 (see FIG. 1) may be further configured to process multiple firewall configuration files 156 to perform one or more functions described herein.

FIG. 2B illustrates an example of the network connectivity matrix 170. Aspects of the network connectivity matrix 170 are described above, and additional aspects are provided below. In one embodiment, the network connectivity matrix 170 may represent network connections 210 between virtual and/or physical network zones 146 (see FIG. 1). For example, network zones 146 may be virtual network zones 146. In another example, network zones 146 may be physical network zones 146. As such, the network management module 150 (see FIG. 1) may further be configured to generate a network connectivity matrix 170 for virtual and/or physical network zones 146.

Figure 3:
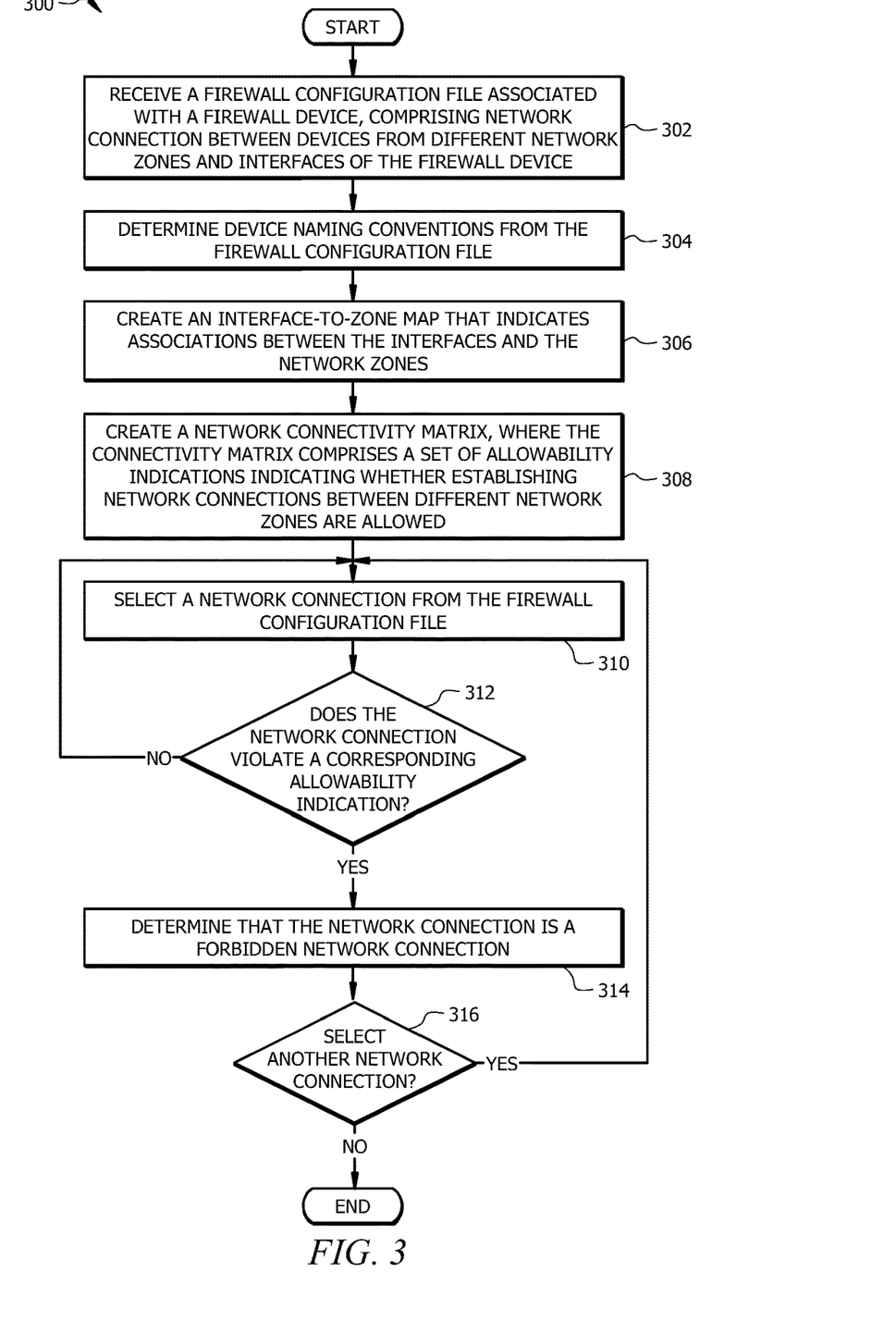
FIG. 3 illustrates an example flowchart of a method for automating identifications of forbidden network connections between devices.

Example Method for Automating Identifications of Forbidden Network Accesses Between Devices FIG. 3 illustrates an example flowchart of a method 300 for automating identifications of forbidden network accesses 210 between devices 134. Modifications, additions, or omissions may be made to method 300. Method 300 may include more, fewer, or other steps. For example, steps may be performed in parallel or in any suitable order. While at times discussed as the system 100, processor 112, network management module 150, compliance engine 152, or components of any of thereof performing steps, any suitable system or components of the system may perform one or more steps of the method 300. For example, on or more steps of method 300 may be implemented, at least in part, in the form of software instructions 154 of FIG. 1, stored on non-transitory, tangible, machine-readable media (e.g., memory 114 of FIG. 1) that when run by one or more processors (e.g., processor 112 of FIG. 1) may cause the one or more processors to perform steps 302-316.

Method 300 begins at step 302 when the network management module 150 receives the firewall configuration file 156 that is associated with the firewall device 122. For example, the network management module 150 may receive the firewall configuration file 156 when the user 104 imports the firewall configuration file 156 into the network management module 150 via the network management software application 178 at the computing device 110. Once the network management module 150 receives the firewall configuration file 156, the network management module 150 processes the firewall configuration file 156 to determine associations or relationships between components 160 identified in the firewall configuration file 156, similar to that described in FIG. 1.

At step 304, the network management module 150 determines the device naming conventions 162 from the firewall configuration file 156, where the device naming conventions 162 are used for naming devices 134 that are connected to the firewall device 122 using particular keywords 164. For example, the network management module 150 may determine or extract the device naming conventions 162 from the firewall configuration file 156 by implementing a text processing technique to parse or read the firewall configuration file 156 to identify keywords 164 in the names 166 of the devices 134. Upon identifying the keywords 164 in the names 166 of the devices 134, the network management module 150 may determine a corresponding network zone 146 that each device 134 belongs to. As such, the network management module 150 may use the device naming convention 162 to determine associations between the names 166 of devices 134 and network zones 146.

At step 306, the network management module 150 creates the interface-to-zone map 174 that indicates associations between the interfaces 124 and network zones 146. For example, the network management module 150 may create the interface-to-zone map 174 by analyzing the firewall configuration file 156 based on the extracted device naming convention 162 to determine the associations between the network zones 146 and interfaces 124. For example, the network management module 150 may determine the associations between the network zones 146 and interfaces 124 from the firewall configuration file 156 by text processing, XML, processing, or any other data format processing technique that the firewall configuration file 156 is stored as, similar to that described in FIG. 1.

At step 308, the network management module 150 creates the network connectivity matrix 170, where the network connectivity matrix 170 comprises the set of allowability indications 172 indicating whether establishing network connections 210 between network zones 146 is allowed. For example, the network management module 150 may create the network connectivity matrix 170 based on processing the set of security policies 180. The set of security policies 180 may indicate which network connections 210 should be allowed and which should be forbidden in the network architecture 120. The purpose of the security policies 180 is to protect devices 134a in the internal zone 126 by filtering and blocking outsiders and other devices 134 from gaining unauthorized access to the devices 134a. For example, the network management module 150 may analyze the set of security policies 180 by implementing text processing, parsing techniques, or other data format processing that the set of security policies 180 may be stored as. Then, the network management module 150 may determine allowability indications 172 indicating allowable and forbidden network accesses 210 between devices 134, and compile the determined allowability indications 172 in a matrix format to generate the network connectivity matrix 170, similar to that illustrated in FIG. 2B.

At step 310, the compliance engine 152 selects a network connection 210 between devices 134 from the firewall configuration file 156. For example, the compliance engine 152 selects a first network connection 210a in the first row 202a of the firewall configuration file 156 illustrated in FIG. 2A. The compliance engine 152 may iteratively select network connections 210 until no more network connection 210 is left for evaluation. For example, the compliance engine 152 selects the network connections 210 in each row 202 until the end of the firewall configuration file 156.

At step 312, the compliance engine 152 determines whether the network connection 210 violates its corresponding allowability indication 172 (in the network connectivity matrix 170). For example, the compliance engine 152 may cross-reference the firewall configuration file 156 with the interface-to-zone map 174 to determine whether the network connection 210 violates its corresponding allowability indication 172, similar to that described in FIG. 1. Several example use-cases for determining whether a network connection 210 between devices 134 complies with the network connectivity matrix 170 based on the interface-to-zone map 174 are described in detail in FIG. 1. If the compliance engine 152 determines that the network connection 210 does not violate its corresponding allowability indication 172, method 300 returns to step 310 to select another network connection 210. If, however, the compliance engine 152 determines that the network connection 210 violates its corresponding allowability indication 172, method 300 proceeds to step 314.

At step 314, the compliance engine 152 determines that the network connection 210 is a forbidden network connection 210, and does not comply with the network connectivity matrix 170.

At step 316, the compliance engine 152 determines whether to select another network connection 210. The compliance engine 152 may determine to select another network connection 210 if at least one network connection 210 is left in the firewall configuration file 156 for evaluation. If the compliance engine 152 determines that there is no more network connection 210 left in the firewall configuration file 156, the method 300 terminates. If, however, the compliance engine 152 determines that there is at least one network connection 210 left in the firewall configuration file 156, the method 300 returns to step 310.

In one embodiment, the compliance engine 152 may generate a report of forbidden network connections 210. In one embodiment, the compliance engine 152 may send an applicable notification to the user 104 to address the forbidden network connections 210. For example, the compliance engine 152 may trigger a message to be displayed on one or more of the computing device 110, devices 134 between which the forbidden network connection 210 is detected, indicating that the network connection 210 is forbidden and makes data at devices 134 vulnerable to being exposed to malicious activities by outsiders. In another, example, the compliance engine 152 may determine IP addresses of the devices 134 between which the forbidden network connection 210 is detected and automatically assign new IP addresses that are within IP address ranges designated to network zones 146 where those devices 134 live. In another example, the compliance engine 152 may determine a device 134 that caused the forbidden network connection 210, determine its IP address that may not be within an IP address range designated to a network zone 146 where the device 134 lives, and assign a new IP address to the device 134 such that the no longer forbidden network connection 210 connects the device 134 with other devices 134. In another example, the compliance engine 152 may terminate the forbidden network connections 210. In another example, the user 104 may confirm, override, or modify any of the actions of the compliance engine 152 in addressing the forbidden network connection 210.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U. S.C. § 112(f) as it exists on the date of filing hereof unless the words "means for" or "step for" are explicitly used in the particular claim.

The invention claimed is:

1. A system for automating identifications of forbidden network connections, comprising:
a memory operable to store a firewall configuration file associated with a firewall device, wherein:
the firewall configuration file comprises a set of network connections between neighboring devices and interfaces of the firewall device;
the neighboring devices belong to corresponding neighboring network zones;
each of the neighboring devices is identified by a name set by a naming convention that is associated with a particular neighboring network zone, such that:
a first device, connected to a first interface of the firewall device, is identified by a first name indicating that the first device belongs to a first network zone, wherein:
the first name is determined based at least on a first naming convention used for naming devices that belong to the first network zone; and
the first naming convention indicates that a first keyword and at least one additional alphanumeric character is included in the first name; and
a second device, connected to a second interface of the firewall device, is identified by a second name indicating that the second device belongs to a second network zone, wherein:
the second name is determined based at least on a second naming convention used for naming devices that belong to the second network zone;
the second naming convention indicates that a second keyword and at least one additional alphanumeric character is included in the second name; and
the first keyword is different from the second keyword;
a processor, operably coupled with the memory, configured to:
create a network connectivity matrix between the neighboring network zones, wherein the network connectivity matrix comprises a set of allowability indications indicating whether establishing network connections between different neighboring network zones is allowed;
create an interface-to-zone map that indicates mappings between a given interface of the firewall device and a respective network zone from within which a device is connected to the given interface based at least in part upon the naming convention used for naming each of the neighboring devices, such that the given interface connected to a device having a name with a particular keyword associated with the respective network zone is mapped to the respective network zone;
determine whether there is any network connection between different neighboring devices that violates a corresponding allowability indication indicated in the network connectivity matrix based at least in part upon cross-referencing the interface-to-zone map with the network connectivity matrix, wherein determining whether there is any network connection between different neighboring devices that violates the corresponding allowability indication indicated in the network connectivity matrix based at least in part upon cross-referencing the interface-to-zone map with the network connectivity matrix comprises:
determining that the network connectivity matrix indicates a first network connection from the first device to the second device;
determining that the interface-to-zone map indicates that the first interface of the firewall device is mapped to the first network zone;
determining that the interface-to-zone map indicates that the second interface of the firewall device is mapped to the second network zone;
identifying a particular allowability indication associated with network connections from the first network zone to the second network zone as indicated in the network connectivity matrix; and
determining whether the particular allowability indication indicates the network connections from the first network zone to the second network zone are allowed; and
in response to determining at least one network connection between different neighboring devices that violates the corresponding allowability indication, determine that the at least one network connection is a forbidden network connection.

2. The system of claim 1, wherein the naming convention for devices in the particular neighboring network zone comprises a particular keyword that is common between the devices in the particular neighboring network zone.

3. The system of claim 1, wherein creating the interface-to-zone map comprises:
   determining that the first device is connected to the first interface;
   determining that the first device belongs to the first network zone based at in part upon the first name that is associated with the first network zone;
   mapping the first interface to the first network zone;
   determining that the second device is connected to the second interface;
   determining that the second device belongs to the second network zone based at in part upon the second name that is associated with the second network zone; and
   mapping the second interface to the second network zone.

4. The system of claim 1, wherein the set of allowability indications identify allowable network connections and a set of forbidden network connections identify forbidden network connections.

5. The system of claim 1, wherein creating the network connectivity matrix between the neighboring network zones comprises:
   determining that network connections from the first network zone to the second network zone should be forbidden;
   in response to determining that network connections from the first network zone to the second network zone should be forbidden, adding a forbidden indication in a corresponding element in the network connectivity matrix;
   determining that network connections from the second network zone to the first network zone should be allowed; and
   in response to determining that network connections from the second network zone to the first network zone should be allowed, adding an allowable indication in a corresponding element in the network connectivity matrix.

6. The system of claim 1, wherein determining whether there is any network connection between different neighboring devices that violates the corresponding allowability indication comprises:
   determining, from the firewall configuration file, that there is a first network connection from the first device to the second device;
   determining that the first network connection allows network traffic from the first network zone to the second network zone;
   determining, from the network connectivity matrix, that a first allowability indication corresponding to the first network connection indicates that network connections from the first network zone to the second network zone are forbidden; and
   determining that the first network connection is violating the first allowability indication.

7. A method for automating identifications of forbidden network connections, comprising:
   creating a network connectivity matrix between neighboring network zones adjacent to a firewall device, wherein:
      the network connectivity matrix comprises a set of allowability indications indicating whether establishing network connections between different neighboring network zones is allowed;
      neighboring devices belong to corresponding neighboring network zones;
      each of the neighboring devices is identified by a name set by a naming convention that is associated with a particular neighboring network zone, such that:
         a first device, connected to a first interface of the firewall device, is identified by a first name indicating that the first device belongs to a first network zone, wherein:
            the first name is determined based at least on a first naming convention used for naming devices that belong to the first network zone; and
            the first naming convention indicates that a first keyword and at least one additional alphanumeric character is included in the first name; and
         a second device, connected to a second interface of the firewall device, is identified by a second name indicating that the second device belongs to a second network zone, wherein:
            the second name is determined based at least on a second naming convention used for naming devices that belong to the second network zone;
            the second naming convention indicates that a second keyword and at least one additional alphanumeric character is included in the second name; and
            the first keyword is different from the second keyword;
   creatine an interface-to-zone map that indicates mappings between a given interface of the firewall device and a respective network zone from within which a device is connected to the given interface based at least in part upon the naming convention used for naming each of the neighboring devices, such that the given interface connected to a device having a name with a particular keyword associated with the respective network zone is mapped to the respective network zone;
   determining whether there is any network connection between different neighboring devices that violates a corresponding allowability indication indicated in the network connectivity matrix based at least in part upon cross-referencing the interface-to-zone map with the network connectivity matrix, wherein determining whether there is any network connection between different neighboring devices that violates the corresponding allowability indication indicated in the network connectivity matrix based at least in part upon cross-referencing the interface-to-zone map with the network connectivity matrix comprises:
      determining that the network connectivity matrix indicates a first network connection from the first device to the second device;
      determining that the interface-to-zone map indicates that the first interface of the firewall device is mapped to the first network zone;
      determining that the interface-to-zone map indicates that the second interface of the firewall device is mapped to the second network zone;
      identifying a particular allowability indication associated with network connections from the first network zone to the second network zone as indicated in the network connectivity matrix; and
      determining whether the particular allowability indication indicates the network connections from the first network zone to the second network zone are allowed; and
   in response to determining at least one network connection between different neighboring devices that violates the corresponding allowability indication, determining that the at least one network connection is a forbidden network connection.

8. The method of claim 7, wherein the naming convention for devices in the particular neighboring network zone comprises a particular keyword that is common between the devices in the particular neighboring network zone.

9. The method of claim 7, wherein creating the interface-to-zone map comprises:
determining that the first device is connected to the first interface;
determining that the first device belongs to the first network zone based at in part upon the first name that is associated with the first network zone;
mapping the first interface to the first network zone;
determining that the second device is connected to the second interface;
determining that the second device belongs to the second network zone based at in part upon the second name that is associated with the second network zone; and
mapping the second interface to the second network zone.

10. The method of claim 7, wherein the set of allowability indications identify allowable network connections and a set of forbidden network connections identify forbidden network connections.

11. The method of claim 7, wherein creating the network connectivity matrix between the neighboring network zones comprises:
determining that network connections from the first network zone to the second network zone should be forbidden;
in response to determining that network connections from the first network zone to the second network zone should be forbidden, adding a forbidden indication in a corresponding element in the network connectivity matrix;
determining that network connections from the second network zone to the first network zone should be allowed; and
in response to determining that network connections from the second network zone to the first network zone should be allowed, adding an allowable indication in a corresponding element in the network connectivity matrix.

12. The method of claim 7, wherein determining whether there is any network connection between different neighboring devices that violates the corresponding allowability indication comprises:
determining, from a firewall configuration file associated with the firewall device, that there is a first network connection from the first device to the second device;
determining that the first network connection allows network traffic from the first network zone to the second network zone;
determining, from the network connectivity matrix, that a first allowability indication corresponding to the first network connection indicates that network connections from the first network zone to the second network zone are forbidden; and
determining that the first network connection is violating the first allowability indication.

13. A non-transitory computer-readable medium storing instructions that when executed by a processor cause the processor to:
create a network connectivity matrix between neighboring network zones adjacent to a firewall device, wherein:
the network connectivity matrix comprises a set of allowability indications indicating whether establishing network connections between different neighboring network zones is allowed;
neighboring devices belong to corresponding neighboring network zones;
each of the neighboring devices is identified by a name set by a naming convention that is associated with a particular neighboring network zone, such that:
a first device, connected to a first interface of the firewall device, is identified by a first name indicating that the first device belongs to a first network zone, wherein:
the first name is determined based at least on a first naming convention used for naming devices that belong to the first network zone; and
the first naming convention indicates that a first keyword and at least one additional alphanumeric character is included in the first name; and
a second device, connected to a second interface of the firewall device, is identified by a second name indicating that the second device belongs to a second network zone, wherein:
the second name is determined based at least on a second naming convention used for naming devices that belong to the second network zone;
the second naming convention indicates that a second keyword and at least one additional alphanumeric character is included in the second name; and
the first keyword is different from the second keyword;
create an interface-to-zone map that indicates mappings between a given interface of the firewall device and a respective network zone from within which a device is connected to the given interface based at least in part upon the naming convention used for naming each of the neighboring devices, such that the given interface connected to a device having a name with a particular keyword associated with the respective network zone is mapped to the respective network zone;
determine whether there is any network connection between different neighboring devices that violates a corresponding allowability indication indicated in the network connectivity matrix based at least in part upon cross-referencing the interface-to-zone map with the network connectivity matrix, wherein determining whether there is any network connection between different neighboring devices that violates the corresponding allowability indication indicated in the network connectivity matrix based at least in part upon cross-referencing the interface-to-zone map with the network connectivity matrix comprises:
determining that the network connectivity matrix indicates a first network connection from the first device to the second device;
determining that the interface-to-zone map indicates that the first interface of the firewall device is mapped to the first network zone;
determining that the interface-to-zone map indicates that the second interface of the firewall device is mapped to the second network zone;
identifying a particular allowability indication associated with network connections from the first network zone to the second network zone as indicated in the network connectivity matrix; and
determining whether the particular allowability indication indicates the network connections from the first network zone to the second network zone are allowed; and in response to determining at least one network connection between different neighboring devices that violates the corresponding allowability indication, determine that the at least one network connection is a forbidden network connection.

14. The non-transitory computer-readable medium of claim 13, wherein the naming convention for devices in the particular neighboring network zone comprises a particular keyword that is common between the devices in the particular neighboring network zone.

15. The non-transitory computer-readable medium of claim 13, wherein creating the interface-to-zone map comprises:
- determining that the first device is connected to the first interface;
- determining that the first device belongs to the first network zone based at in part upon the first name that is associated with the first network zone;
- mapping the first interface to the first network zone;
- determining that the second device is connected to the second interface;
- determining that the second device belongs to the second network zone based at in part upon the second name that is associated with the second network zone; and
- mapping the second interface to the second network zone.

16. The non-transitory computer-readable medium of claim 13, wherein the set of allowability indications identify allowable network connections and a set of forbidden network connections identify forbidden network connections.

17. The non-transitory computer-readable medium of claim 13, wherein creating the network connectivity matrix between the neighboring network zones comprises:
- determining that network connections from the first network zone to the second network zone should be forbidden;
- in response to determining that network connections from the first network zone to the second network zone should be forbidden, adding a forbidden indication in a corresponding element in the network connectivity matrix;
- determining that network connections from the second network zone to the first network zone should be allowed; and
- in response to determining that network connections from the second network zone to the first network zone should be allowed, adding an allowable indication in a corresponding element in the network connectivity matrix.

* * * * *